United States Patent
Hogberg

Patent Number: 5,757,848
Date of Patent: May 26, 1998

[54] METHOD AND APPARATUS FOR A DECIMATING DIGITAL PN CORRELATOR

[75] Inventor: Shawn Wesley Hogberg, Chandler, Ariz.

[73] Assignee: Motorola, Inc., Schaumburg, Ill.

[21] Appl. No.: 565,125

[22] Filed: Nov. 30, 1995

[51] Int. Cl.[6] .................. H04B 15/00; H04K 1/00; H04L 27/30
[52] U.S. Cl. ............................... 375/208; 342/145
[58] Field of Search ........................... 375/200, 208, 375/209, 210, 340, 343, 346, 349, 350, 367; 364/724.1, 724.11, 728.03, 728.07; 342/145, 195, 202

[56] References Cited

U.S. PATENT DOCUMENTS

| | | |
|---|---|---|
| 4,034,370 | 7/1977 | Mims .......................... 343/5 |
| 4,471,357 | 9/1984 | Wu et al. ..................... 343/5 |
| 5,148,452 | 9/1992 | Kennedy et al. ............. 375/200 |
| 5,177,691 | 1/1993 | Welles et al. ................ 364/485 |
| 5,276,705 | 1/1994 | Higgins ....................... 375/200 |

Primary Examiner—Tesfaldet Bocure
Assistant Examiner—Bryan Webster
Attorney, Agent, or Firm—Frank J. Bogacz

[57] ABSTRACT

A decimating digital PN receiver (10) processes a target return signal. The target return signal is decimated (34) processed at a slower speed. The decimated target return signal is then digitally correlated (28). The correlated signal is digitally filtered (30) and a fast Fourier transform (32) is applied to produce the output (33).

22 Claims, 5 Drawing Sheets

COEFFICIENTS OF f(x) ARE REPRESENTED
BY THE BINARY SEQUENCE, {0 1 0 0 1 1},
REFERRED TO AS AN OCTAL 23 PN SEQUENCE

IRREDUCIBLE POLYNOMIAL $f(x) = x^4 + x + 1$

PN SEQUENCE BIT NUMBER

TRANSMITTER PN SEQUENCE

DELAYED RECEIVER PN SEQUENCE

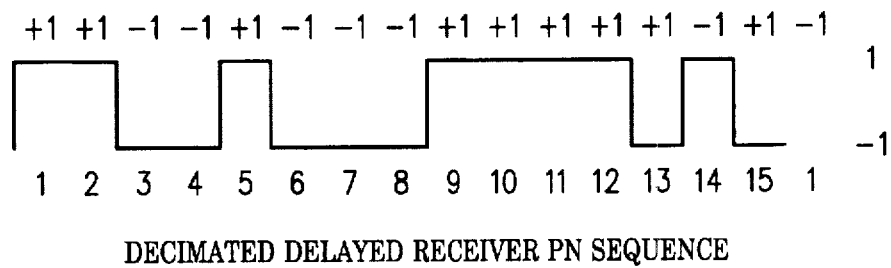
DECIMATED DELAYED RECEIVER PN SEQUENCE
FIG. 7
FIG. 8
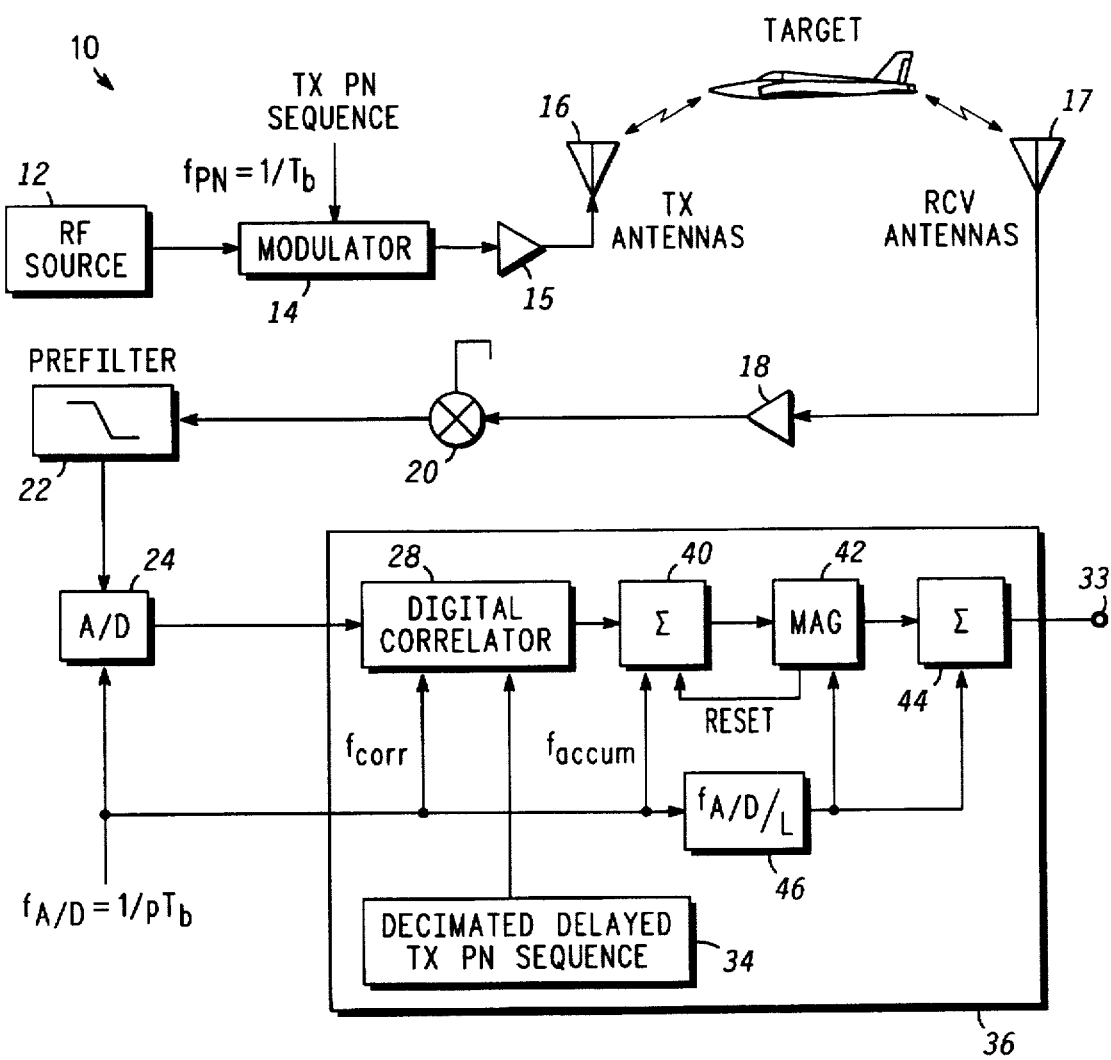

5,757,848

METHOD AND APPARATUS FOR A DECIMATING DIGITAL PN CORRELATOR

BACKGROUND OF THE INVENTION

The present invention pertains to signal return receivers and more particularly to a digital correlation method and apparatus for a range measurement channel.

A major problem with implementing any PN (Psuedorandom Noise) digital correlation receiver is designing and fabricating analog-digital converter (ADC) and digital signal processing (DSP) hardware capable of sampling, correlating, and filtering at or beyond the transmit PN sequence bit rate. Typical applications require sequence bit rates of 40 MHz or greater and require a high resolution ADC (14 bits) capable of sampling at a minimum of this bit rate.

Present ADC technology is not adequate (limited to 12 bits at 50 MHz, 14 bits at 20 MHz) and is very expensive for these conversion rates.

What is needed is a digital PN receiver which provides high range resolution receiver without the need for extremely fast digital circuitry.

BRIEF DESCRIPTION OF THE DRAWING

FIG. 7 is a waveform diagram of a decimated delayed receiver PN sequence in accordance with the present invention.

FIG. 8 is a block diagram decimating digital PN correlator without relative velocity output in accordance with the present invention.

DESCRIPTION OF THE PREFERRED EMBODIMENT

This invention uses a property of PN sequences to generate a receiver correlation PN sequence by decimating the original transmitted PN sequence by a integer factor, $\rho$ (where $\rho$ is prime to the PN sequence length, L). The importance of using these decimated receiver PN correlation sequences is the reduction of the ADC sampling rate by the integer factor, $\rho$, while maintaining the range resolution ($cT_b/2$), where c is the speed of light, of the original transmitted sequence set by its bitwidth ($T_b$). Also, the correlation, filtering, and Fourier processing rates are reduced by the same factor, $\rho$. Therefore, this invention allows the use of less expensive high precision ADC and DSP hardware that is available using existing technology and greatly improves the producibility and feasibility of digital PN receivers.

Figure 1:
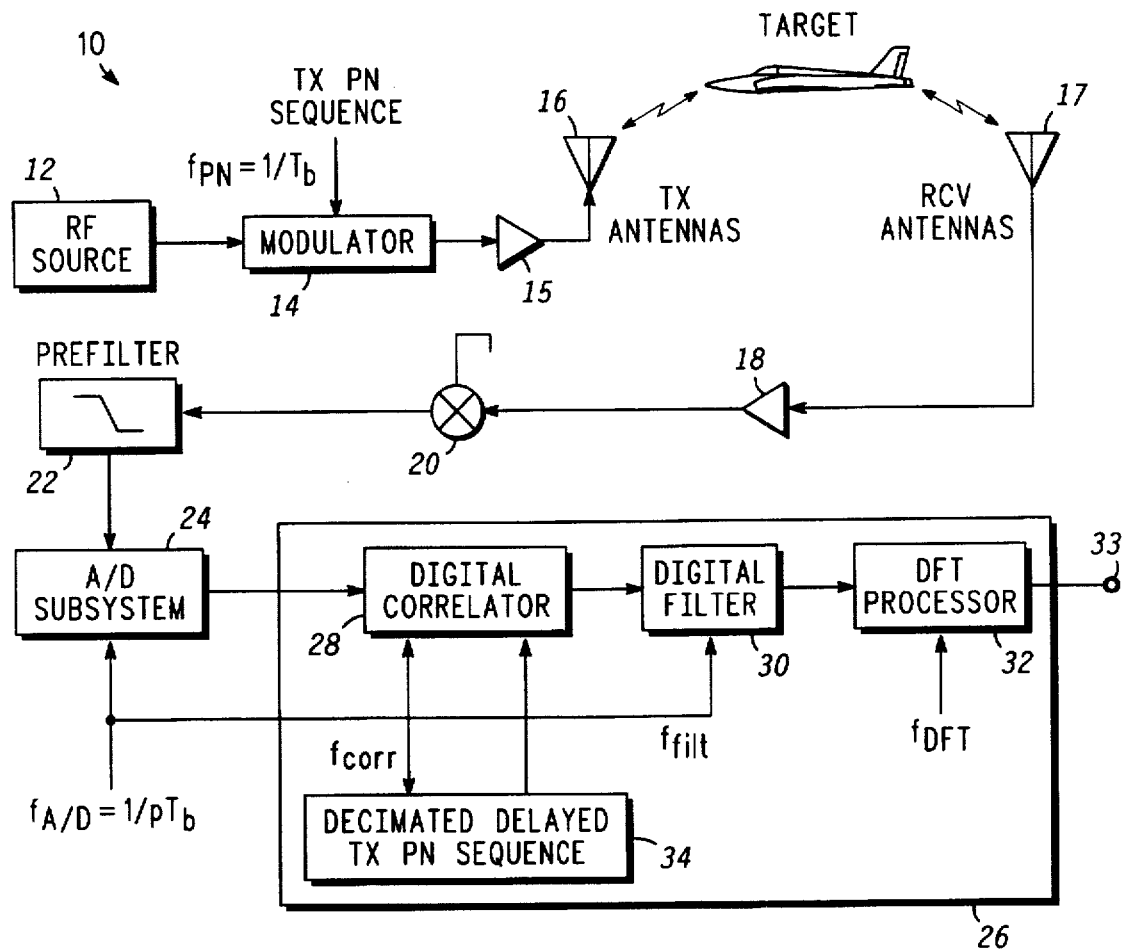
FIG. 1 is a block diagram decimating digital PN correlator in accordance with the present invention.

FIG. 1 is a block diagram that illustrates the typical PN Radar application that uses a decimating digital PN receiver. The continuous-wave (CW) RF source (12) is biphase modulated using an analog biphase modulator 14 and a transmit PN sequence with a clock frequency, $f_{PN}$. The PN sequence bitwidth, $T_b$, is determined by the range resolution requirements. The output of the biphase modulator 14 is sent into a power amplifier 15 and then to the transmit antennas 16. The signal at the receive antennas 17 is delayed, attenuated, and shifted in frequency due to the target distance and relative motion of the target with respect to the radar. The received signal is sent through a high gain low noise amplifier 18 to set the receiver noise figure. The output of the low noise amplifier 18 is converted to baseband using the down conversion mixer 20 and a reference signal from the RF source 12. The baseband signal has a PN spectrum centered at the target Doppler frequency.

The down conversion mixer 20 baseband output signal is sent through a prefilter 22 to reduce the wideband noise before it is sampled by the analog-digitial (A/D) converter 24. The sampling clock frequency, $f_{A/D}$, of the A/D is required to be synchronous with the transmit PN sequence clock frequency, $f_{PN}$. In this invention, it is shown that the sampling clock frequency of the A/D 24 can be substantially less than the transmit PN sequence clock frequency by using the principles of decimating PN sequences.

Range channel 26 includes digital correlator 28 coupled to digital filter 30. DFT processor 32 is coupled to digital filter 30. Decimated delayed PN sequence 34 is coupled to digital correlator 28. Although only one range channel 26 is shown for most practical application of this method to detect target range, a number of range channels 26 would be required. The number of range channels depends upon the desired range resolution and maximum detection range of the system.

The sampled A/D 24 output baseband signal is sent through a digital correlator 28 driven by the receiver PN sequence 34 which is a delayed replica of the transmit PN sequence. The digital correlator 28 inverts the sign bit of the samples depending on the value of the receiver PN sequence. At correlated ranges the output of the digital correlator 28 for a single point target not in the presence of clutter or noise is a pure sinusoidal signal with a frequency equal to the target Doppler frequency. At uncorrelated ranges the output of the digital correlator 28 is a PN modulated waveform centered at a frequency equal to the target Doppler frequency. The output of the digital correlator 28 is sent to the input of the digital filter 30 to attenuate all spectral lines with the exception of the spectral line centered at the target Doppler frequency. The digital filter 30 cutoff frequency is usually equal to one-half of the decimated PN sequence word line frequency (WRF), $$f_{WRF} = 1/2 WRF = 1/2[1/\rho L T_b].$$

The output of the digital filter 30 is sent to an DFT processor 32 to perform Fourier processing to extract range rate (relative velocity) information and target-clutter discrimination. The implementation of the DFT processor 32 is usually accomplished by using an efficient algorithm such as a Fast Fourier Transform (FFT).

The digital correlator 28, digital filter 30, DFT processor 32, and the receiver decimated PN sequence 34 are duplicated for each required range channel. The range channels are aligned to correlate receive signals for targets at specific ranges depending on the delay of the receive decimated PN sequence.

Figure 2:
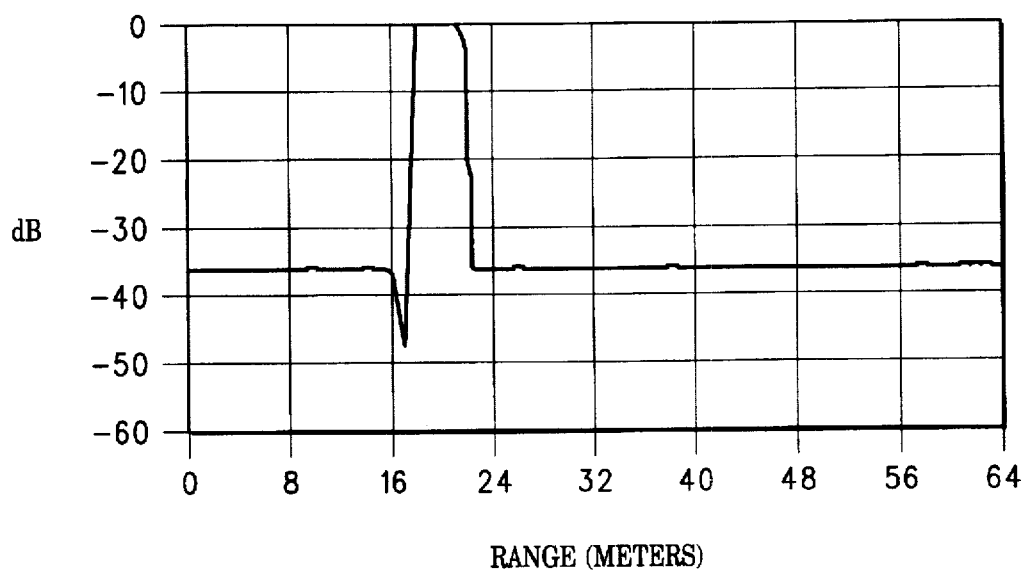
FIG. 2 is a graph of a dceimating PN correlator with ($\rho=4$) in accordance with the present invention.

A typical range response from a decimating ($\rho=4$) PN receiver channel using a 63 bit sequence centered at 20 meters is shown in FIG. 2. The clutter rejection for a receiver using a 63 bit PN sequence is 36 dB, 20 log10 (1/L), according to the autocorrelation property of PN sequences. The decimation process produces a PN sequence of the same length as the original transmit PN sequence (in this case it produced the same sequence) which results in the same autocorrelation property and clutter rejection as the non-decimating PN receiver.

The following is an example of the process to be followed to implement a decimating digital PN receiver for a typical PN radar application.

Figure 3:
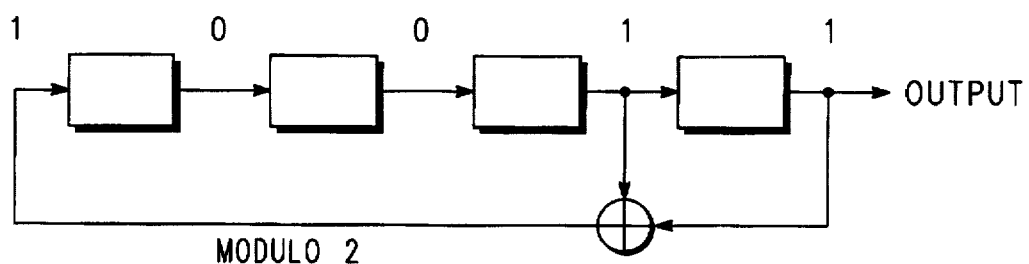
FIG. 3 is a block diagram of shift register for generating a PN sequence in accordance with the present invention.
Figure 4:
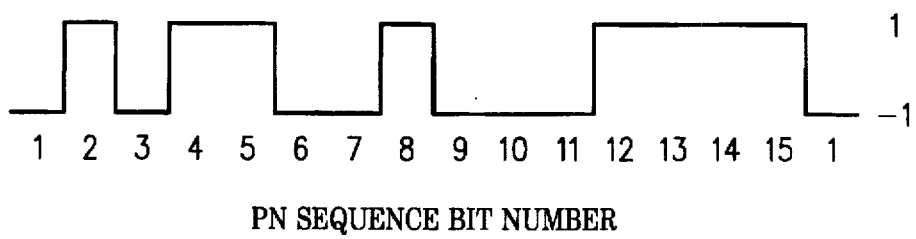
FIG. 4 is a waveform of the output of the shift register of FIG. 3.

First, choose the transmitter PN sequence and implementation. An example of a 15 bit Octal 23 PN sequence is shown in FIG. 3. The octal number 23 is represented in binary form as 010 011. The shift register of FIG. 3 generates an octal 23 sequence of bits. The output waveform of the shift register of FIG. 3 is shown in FIG. 4. Other PN sequences may be chosen. Note the tables given below.

Table 1 shows information for the octal 45 PN sequence for prime factors, $\rho$, equal to 2 through 8. If $\rho$ is equal to 2, 4, or 8, the prime correlation sequence is the original octal 45 PN sequence except for a phase shift.

TABLE 1

Octal 45 PN Decimated Correlation Sequences

| $\rho$ | PN Sequence Octal Designation |
|---|---|
| 2 | 45 |
| 3 | 75 |
| 4 | 45 |
| 5 | 67 |
| 6 | 75 |
| 7 | 57 |
| 8 | 45 |

The cosets of the integers, $\rho$, between 1 and (L-1) which are prime to L (sequence length), can be determined for each shift register length. Examples of these cosets are listed for sequence lengths of 7, 15, 31, 63, 127, and 255 in Tables 2 through 7.

TABLE 2

Cosets for Octal 13 PN Sequence (L = 7)

| Group | Valid $\rho$ factors | Octal Designator |
|---|---|---|
| 1 | 1, 2, 4 | 13 |
| 2 | 3, 6, 5 | 15 |

TABLE 3

Cosets for Octal 23 PN Sequence (L = 15)

| Group | Valid $\rho$ factors | Octal Designator |
|---|---|---|
| 1 | 1, 2, 4, 8 | 23 |
| 2 | 7, 14, 13, 11 | 31 |

TABLE 4

Cosets for Octal 45 PN Sequence (L = 31)

| Group | Valid $\rho$ factors | Octal Designator |
|---|---|---|
| 1 | 1, 2, 4, 8, 16 | 45 |
| 2 | 3, 6, 12, 24, 17 | 75 |
| 3 | 9, 18, 5, 10, 20 | 67 |
| 4 | 27, 23, 15, 30, 29 | 51 |
| 5 | 19, 7, 14, 28, 25 | 57 |
| 6 | 26, 21, 11, 22, 13 | 73 |

The results in Tables 2 and 4 show that any $\rho$ factor from 1 to (L-1) will yield a PN sequence. This is true for any PN sequence if the length of the sequence is a prime numbers, i.e. (L=3,7,31,127). Table 3 illustrates a case where the length of the PN sequence is not a prime number and $\rho$ factors 3, 5, 6, 9, 10, and 12 will not yield a PN sequence.

The results in Tables 5, 6, and 7 are listed in general terms without specifying a particular PN sequence. The designation $PN_1$ refers to the original sequence being decimated and the designations $PN_2$, $PN_3$, $PN_4$, etc. refer to the other possible unique PN sequences for the given shift register length.

TABLE 5

Cosets for a 63 Bit PN Sequence

| Group | Valid $\rho$ factors | Octal Designator |
|---|---|---|
| 1 | 1, 2, 4, 8, 16, 32 | original sequence, $PN_1$ |
| 2 | 5, 10, 20, 40, 17, 34 | $PN_2$ |
| 3 | 25, 50, 37, 11, 22, 44 | $PN_3$ |
| 4 | 62, 61, 59, 55, 47, 31 | $PN_4$ |
| 5 | 58, 53, 43, 23, 46, 29 | $PN_5$ |
| 6 | 38, 13, 26, 52, 41, 19 | $PN_6$ |

TABLE 6

Cosets for a 127 Bit PN Sequence

| Group | Valid $\rho$ factors | Octal Designator |
|---|---|---|
| 1 | 1, 2, 4, 8, 16, 32, 64 | original sequence, $PN_1$ |
| 2 | 3, 6, 12, 24, 48, 96, 65 | $PN_2$ |
| 3 | 9, 18, 36, 72, 17, 34, 68 | $PN_3$ |
| 4 | 27, 54, 108, 89, 51, 102, 77 | $PN_4$ |
| 5 | 81, 35, 70, 13, 26, 52, 104 | $PN_5$ |
| 6 | 116, 105, 83, 39, 78, 29, 58 | $PN_6$ |
| 7 | 94, 61, 122, 117, 107, 87, 47 | $PN_7$ |
| 8 | 28, 56, 112, 97, 67, 7, 14 | $PN_8$ |
| 9 | 84, 41, 82, 37, 74, 21, 42 | $PN_9$ |
| 10 | 125, 123, 119, 111, 95, 63, 126 | $PN_{10}$ |
| 11 | 121, 115, 103, 79, 31, 62, 124 | $PN_{11}$ |
| 12 | 109, 91, 55, 110, 93, 59, 118 | $PN_{12}$ |
| 13 | 73, 19, 38, 76, 25, 50, 100 | $PN_{13}$ |
| 14 | 92, 57, 114, 101, 75, 23, 46 | $PN_{14}$ |
| 15 | 22, 44, 88, 49, 98, 69, 11 | $PN_{15}$ |
| 16 | 66, 5, 10, 20, 40, 80, 33 | $PN_{16}$ |
| 17 | 71, 15, 30, 60, 120, 113, 99 | $PN_{17}$ |
| 18 | 86, 45, 90, 53, 106, 85, 43 | $PN_{18}$ |

TABLE 7

Cosets for a 255 Bit PN Sequence

| Group | Valid p factors | Octal Designator |
|---|---|---|
| 1 | 1, 2, 4, 8, 16, 32, 64, 128 | original sequence, $PN_1$ |
| 2 | 7, 14, 28, 56, 112, 224, 193, 131 | $PN_2$ |
| 3 | 49, 98, 196, 137, 19, 38, 76, 152 | $PN_3$ |
| 4 | 88, 176, 97, 194, 133, 11, 22, 44 | $PN_4$ |
| 5 | 106, 212, 169, 83, 166, 77, 154, 53 | $PN_5$ |
| 6 | 232, 209, 163, 71, 142, 29, 58, 116 | $PN_6$ |
| 7 | 94, 188, 121, 242, 229, 203, 151, 47 | $PN_7$ |
| 8 | 148, 41, 82, 164, 73, 146, 37, 74 | $PN_8$ |
| 9 | 253, 251, 247, 239, 223, 191, 127, 254 | $PN_9$ |
| 10 | 241, 227, 199, 143, 31, 62, 93, 186 | $PN_{10}$ |
| 11 | 157, 59, 118, 236, 217, 179, 103, 206 | $PN_{11}$ |
| 12 | 79, 158, 61, 122, 244, 233, 211, 167 | $PN_{12}$ |
| 13 | 43, 86, 172, 89, 178, 101, 202, 149 | $PN_{13}$ |
| 14 | 46, 92, 184, 113, 226, 197, 139, 23 | $PN_{14}$ |
| 15 | 67, 134, 13, 26, 52, 104, 208, 161 | $PN_{15}$ |
| 16 | 214, 173, 91, 182, 109, 218, 181, 107 | $PN_{16}$ |

Figure 5:
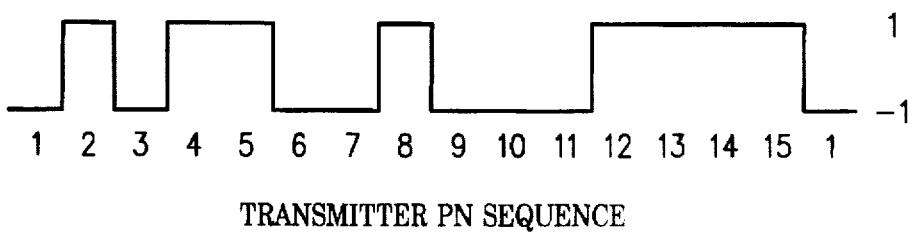
FIG. 5 is a waveform diagram of a transmitter PN sequence in accordance with the present invention.
Figure 6:
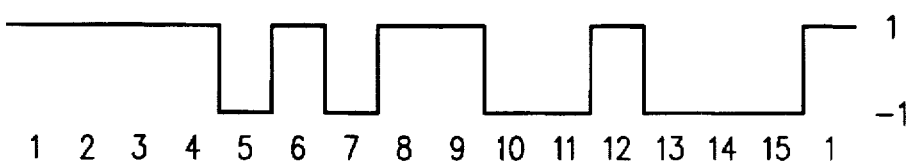
FIG. 6 is a waveform diagram of a delayed receiver PN sequence in accordance with the present invention.

Next, for each range channel determine the appropriate for the normal receiver PN sequence. For example if the transmitter PN sequence bitwidth is set to 4 meters and the receiver range channel is desired to be set to 16 meters a delay of 4 bits is necessary for the receiver PN sequence as shown in FIG. 5 and FIG. 6. FIG. 5 shows the PN sequence input to biphase modulator 14 for broadcast by the target detection system 10. FIG. 6 shows the output of A/D subsystem 24. The waveform of FIG. 6 has been delayed 4 bit periods from the waveform of FIG. 5.

The decimated receiver PN sequence is calculated by decimating the delayed receiver PN sequence from selected and generated above by the decimation factor, ρ. For this example, a decimation factor, ρ, is set to two and the decimated PN sequence is the same as the transmitter PN sequence except for the delay.

The delayed PN sequence for FIG. 6 is as follows:
1,1,1,1,-1,1,1,-1,-1,1,-1,1,1,1,1,-1,1,-1,1,-1,1,1,-1,-1 (Seq. 1)

Sequence 1 (Seq. 1) is then decimated by two for this example. After decimation the following sequence (Seq. 2) results as graphically shown in FIG. 7.
1,1,-1,-1,1,-1,-1,1,1,1,1,-1,-1,-1 (Seq. 2)

This decimated delayed receiver PN sequence is stored for use by the digital correlator 28. The digital correlator 28 operates on the sign bit of the samples output from the A/D subsystem 24. The digital correlator 28 inverts the sign bit of each sample that is taken when the receiver decimated PN sequence bit is equal to −1. If the receiver decimated PN sequence bit is equal to +1, the A/D sample is not modified. It should be noted that the A/D subsystem 24, digital correlator 28, digital filter 30, and DFT processor 32 clocks (i.e. $f_{A/D}$, $f_{corr}$, $f_{filt}$ and $f_{DFT}$) must be synchronized with the transmit PN sequence clock input to biphase modulator 14, $f_{PN}$.

The digital filter 30 may be implemented as either Finite Impulse Response (FIR) or Infinite Impulse Response (IIR) filters. The FIR filter implementations have the advantage of stability while the IIR filter implementations are easier to implement. The decimating digital correlator of FIG. 1 is not dependent upon the specific implementation of the digital filter. The typical cutoff frequency of the digital filter 30 must be set to approximately ½ of the WRF of the decimated receiver PN sequence (Seq. 2). The order of the filter depends on the amount of rejection required for the specific application.

DFT processor 32 provides the system output 33. DFT processor may be implemented with a fast Fourier transform (FFT) function performed on the output of digital filter 30.

The following example process is an implementation of a decimating digital PN receiver in accordance with the present invention for a typical PN radar application.

First, the required range resolution, ΔR, is determined. This is selected prior to design of a radar system, for example.

Next, the transmit modulator PN sequence bitwidth, $T_b$, is calculated using:

$$T_b = 2\Delta R/c$$

where c is the speed of light

This sets the PN bit clock frequency, $f_{PN}$, of the transmit PN sequence generator, $$1/T_b.$$

It also relates to the required input bandwidth of the A/D subsystem 24 as defined below. This is input to biphase modulator 14 as its clock. The A/D subsystem 24, digital correlator 28, digital filter 30 and decimated delayed PN sequence 34 are usually derived from the PN bit clock frequency.

Next, the normal input bandwidth, B, required for the A/D subsystem 24 to maintain the range resolution is calculated.

$$B \geq c/2\Delta R = 1/T_b = f_{PN}$$

$B \geq c/2\Delta R = 1/T_b = f_{PN}$

Typically, the A/D subsystem 24 will include an anti-aliasing pre-filter circuit, a sample and hold circuit, and a high-speed flash analog-digital circuit (all not shown). The bandwidth of this subsystem must be at least equal to the PN sequence clock frequency, $f_{PN}$.

The desired PN sequence length, L, is chosen and the maximum unambiguous range, $R_{max}$, is calculated using:

$$R_{max} = L[cT_b/2]$$

where L is the PN sequence length

Next, the maximum unambiguous Doppler frequency, $f_{max}$ is calculated, where $$f_{max} = \frac{1}{2\rho} \; 1/LT_b = \frac{1}{2\rho} \; WRF$$

where WRF is the word repetition frequency

Then for each range channel 26, the following process is performed. First, the decimation factor, ρ, and the transmit PN sequence length, L, determined by considering:

1) the required input bandwidth calculated above
2) the desired A/D sampling frequency, $f_{A/D}$
3) the desired decimated receiver PN sequence which is formed based on the decimation factor, ρ, and the original transmit PN sequence.
4) the maximum unambiguous Doppler frequency capability of the receiver, $f_{max}$
5) the maximum unambiguous range capability of the receiver, $R_{max}$ For example, a typical PN radar application might require a 2 meter range resolution which yields a transmit PN sequence bit frequency of 75 MHz. Therefore, 75 MHz is the minimum A/D subsystem input bandwidth. Current A/D technology that could sample a signal at 75 MHz is limited to low resolution devices that are very expensive. By selecting a decimation factor, $\rho$, equal to 4, the A/D sampling is reduced to 18.75 MHz which is feasible for lower cost, higher resolution A/D devices. By decimating by a factor of 4, the maximum unambiguous Doppler frequency, $f_{max}$, is reduced by a factor of 4 due to the frequency compression of the PN spectral lines in the frequency domain.

Therefore, a trade-off is made between the maximum unambiguous range and the maximum unambiguous Doppler frequency by adjusting the transmit PN sequence length, L. Specifically, if a transmit PN sequence of length 255 bits is used, the maximum unambiguous Doppler frequency without decimation is 147 kHz. By decimating the receive signal by a factor of 4 and correlating this signal with a decimated receiver PN sequence, the maximum unambiguous Doppler frequency is reduced to 36.8 kHz. One might choose to decrease the maximum unambiguous range from 510 meters to 254 meters by reducing the length of the transmit PN sequence from 255 bits to 127 bits which increases the maximum unambiguous Doppler frequency from 36.8 kHz to 73.8 kHz.

Finally, the use of specific PN sequences can be based on receiver response characteristics and controlled by carefully choosing the combination of the transmit PN sequence and the decimation factor, $\rho$. If $\rho=2^n$ then the output of the correlator is the same PN sequence input to the biphase modulator 14. If $\rho$ is not $=2^n$ then a different PN results that the one input.

Next the A/D sampling frequency, $f_{A/D}$, is calculated using:

$$f_{A/D} = \frac{1}{\rho T_b}$$

The digital correlator clock frequency, $f_{corr}$, and the digital filter clock frequency, $f_{flt}$, are equal to the A/D sampling frequency. Therefore, the cost of implementing these functions is significantly reduced.

Then the DFT (FFT) sampling frequency, $f_{DFT}$, is calculated using:

$$f_{DFT} = 1/\rho L T_b$$

Lastly, the required frequency resolution of the receiver is calculated, $\Delta f$.

Other processing circuitry selects the number of DFT samples output on lead 33 to process to meet the required frequency resolution.

A typical radar application might require approximately 2 kHz frequency resolution and the desired implementation of an DFT involves the use of an FFT algorithm. Therefore, one might choose to accumulate 64 samples for the FFT algorithm. Using the previous example, the DFT sampling frequency is 147.6 kHz ($\rho=4$, $L=127$, $T_b=13.33$ nanoseconds). For 64 samples, the total integration time is 0.433 milliseconds which yields an FFT frequency bin size (resolution) equal to approximately 2.3 kHz.

FIG. 8 is a block diagram of a decimating PN correlator similar to FIG. 1 which also provides a ranging function without relative velocity measurement. If the measurement of target Doppler frequency (velocity) is not required, a set of accumulators (40 and 44) can be used instead of a digital filter 30 and DFT processor 32 to measure target range very accurately.

The first accumulator 40 is used to accumulate the digital correlator output over exactly one receiver PN sequence period. At the end of each PN sequence interval the magnitude of the accumulator is found by magnitude function 42 and passed to accumulator 44. Accumulator 44 executes for a predetermined number of PN sequence intervals depending on the required target detection integration time and the frequency response of the accumulator (behaves like a low-pass filter) in comparison to the target Doppler frequency. Timing function 46 provides proper timing for magnitude function 42 and accumulator 44.

Figure 9:
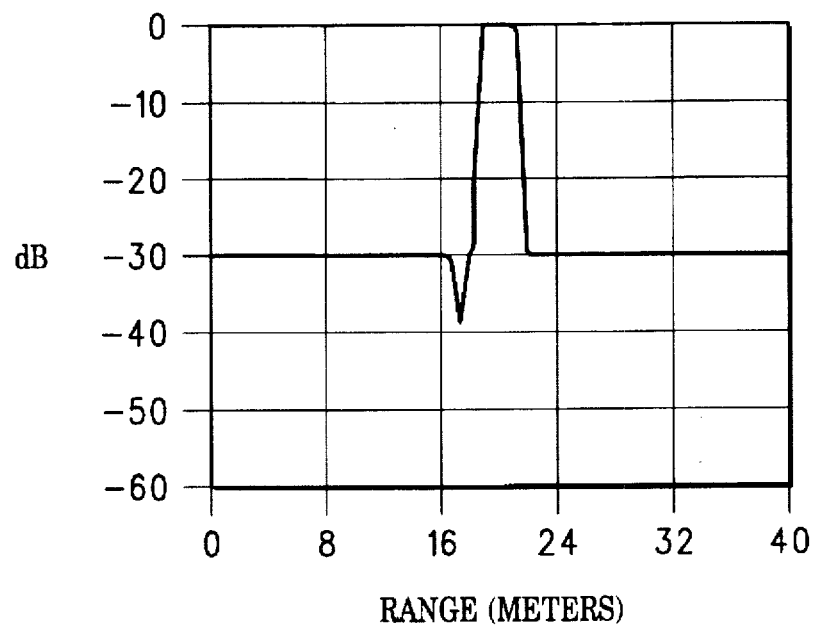
FIG. 9 is a waveform diagram of an output of a PN sequence receiver measuring range only without decimating in accordance with the present invention.
Figure 10:
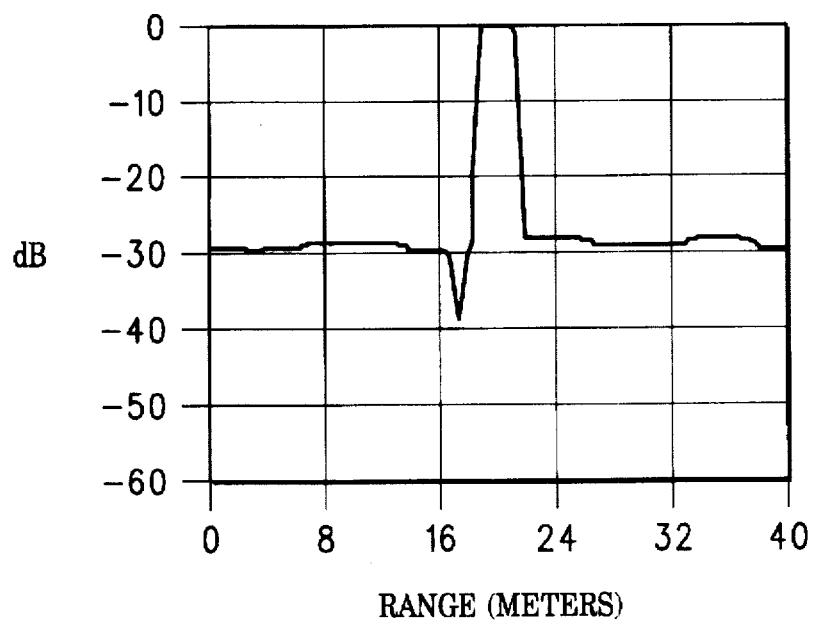
FIG. 10 is a waveform diagram of an output of a PN sequence receiver measuring range only using decimation in accordance with the present invention.

FIG. 9 shows an output 33 waveform diagram of a ranging only system such as that shown in FIG. 8 without the decimating function. FIG. 10 shows an output 33 waveform with the decimating function as shown in FIG. 8. As can be seen from FIGS. 9 and 10 the use of the decimating function changes the quality of the output 33 very little. Since the decimation function provides for a slower sampling rate, less expensive circuitry and components are required for the receiver function.

For some applications it is desirable to improve the range discrimination capability of the transmit waveform. There are methods to allow a binary sequence to yield an out-of-phase autocorrelation value equal to zero.

Phase Modulation Method: Replace the binary values of +1 and −1 with +1 and $e^{+j\phi}$ for transmit and receiver PN sequences as defined by the following expression:

$$\phi = \cos^{-1}\left[-\frac{L-1}{L+1}\right]$$

Amplitude Modulation Method: Replace the binary values of +1 and −1 with +1 and $\beta$ for transmit and receiver PN sequences as defined by the equations:

$$\beta = -1 \pm \frac{2}{\sqrt{L+1}}$$

This equation assumes that the number of +1 bits in the sequence is less than the number of $\beta$ bits by exactly one bit. Otherwise, the +1 bits are modified to yield perfect autocorrelation and the expression is modified (replace +1 and −1 bits with $\beta'$ and −1 bits).

$$\beta' = 1 \pm \frac{2}{\sqrt{L+1}}$$

Cross-correlation Method: Transmit a binary sequence with values of +1 and −1 and correlate it with a receiver PN sequence of +1 and -b (b>=0) values. The value of b is defined by the equations:

$$b = -\frac{\lambda - n}{\lambda' - n} \text{ where } \lambda = \frac{(L+1)}{4} \quad \lambda' = \frac{(L-3)}{4} \quad n = \frac{(L+1)}{4}$$

Using these equations the value of b for any PN sequence is equal to zero. Therefore, the receiver PN sequence is composed of +1's and 0's while the transmit PN sequence is composed of +1's and −1's bits.

Figure 11:
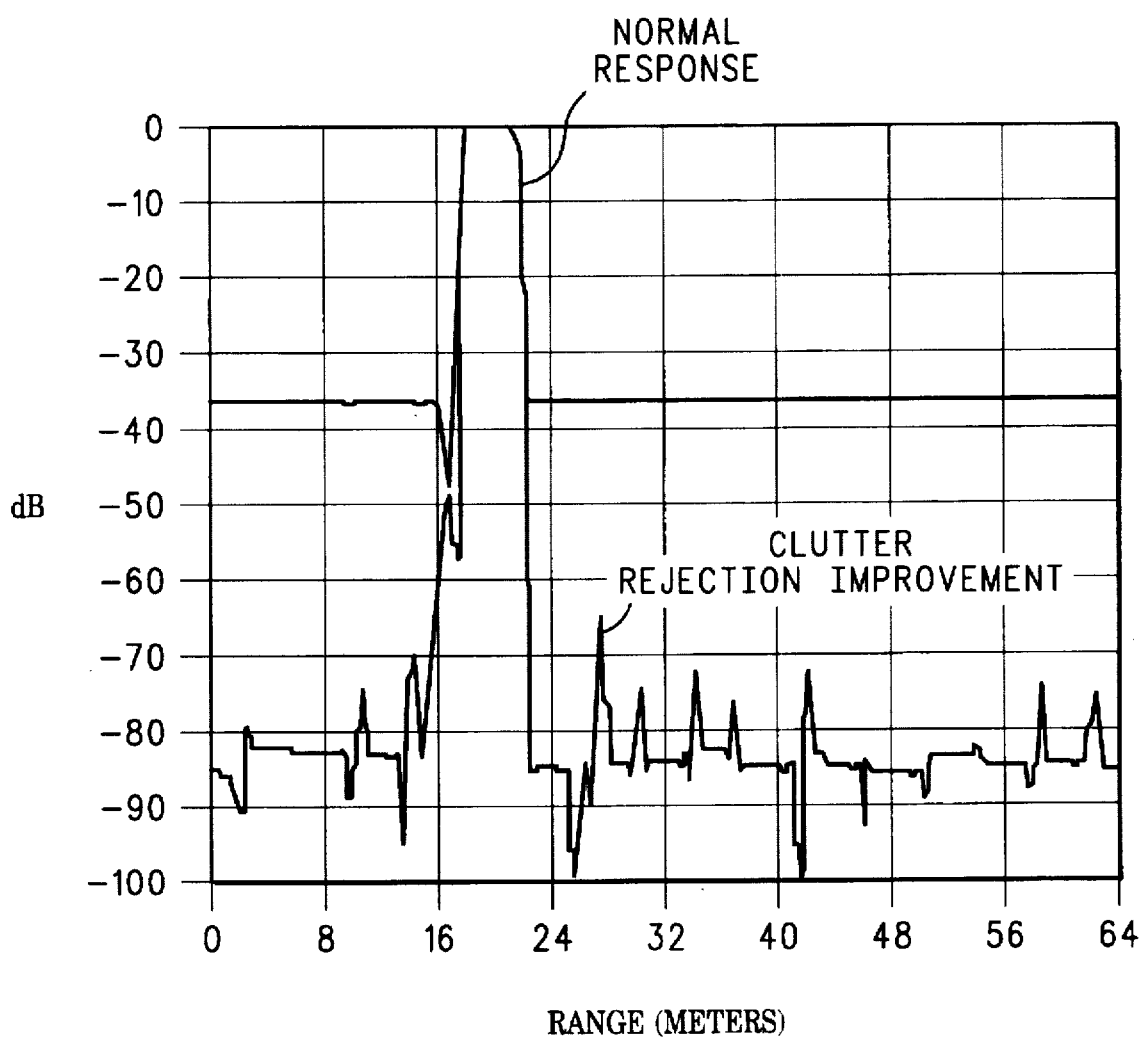
FIG. 11 is a waveform diagram of an output of a PN sequence receiver with one of a number of alternate modulation techniques in accordance with the present invention.

The above modulation methods can produce better rejection results than the biphase modulation method. The typical biphase modulation can produce about 36 db of clutter rejection whereas the above modulation methods can produce greater than 60 db of clutter rejection as shown in FIG. 11.

This decimating digital PN receiver makes it possible to build high range resolution receivers without the need for extremely fast digital hardware such as ADCs, correlators, filters, and DSP chips. This is accomplished by reduced cost and complexity components due to the ability to have slower running (frequency) components.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a PN receiver system, an apparatus for digital decimation of a signal returned from a target, said signal being converted by a down converter and being converted to digital form by an analog/digital converter, said apparatus for digital decimation of a signal comprising:

a decimator coupled to said analog/digital converter, said decimator for producing a decimated signal from said signal returned from said target;

a digital correlator coupled to sid decimator, said digital correlator operating in response to said decimated signal to produce a sinusoidal signal having a frequency equal to a Doppler frequency of said target for correlated ranges and to produce a modulated signal centered at said Doppler frequency of said target for uncorrelated ranges; and a modulator for transmitting to said target a continuous wave signal modulated by a PN sequence.

2. In a PN receiver system, an apparatus for digital decimation as claimed in claim 1 wherein there is included a digital filter coupled to said digital correlator, said digital filter for providing attenuation of all frequencies, except said Doppler frequency of said target.

3. In a PN receiver system, an apparatus for digital decimation as claimed in claim 2 wherein there is included at least one range gate, each said at least one range gate including said decimator, said digital correlator and said digital filter.

4. In a PN receiver system, an apparatus for digital decimation as claimed in claim 3 wherein each range gate further includes a processor providing an output which includes range information of said target and velocity information of said target.

5. In a PN receiver system, an apparatus for digital decimation as claimed in claim 4 wherein said processor includes a fast Fourier transform processor to extract range and velocity information.

6. In a PN receiver system an apparatus for digital decimation as claimed in claim 1 wherein there is further included:

for a first set of PN sequences, said signal returned from said target being identical to said transmitted PN sequence; and for a second set of PN sequences, said signal returned from said target beig predictably different from said transmitted PN sequence.

7. In a PN receiver system, an apparatus for digital decimation of a signal returned from a target, said signal being converted by a down converter and being converted to digital form by an analog/digital converter, said apparatus for digital decimation of a signal comprising:

a decimator coupled to said analog/digital converter, said decimator for producing a decimated signal from said signal returned from said target;

a digital correlator coupled to said decimator, said digital correlator operating in response to said decimated signal to produce a sinusoidal signal having a frequency equal to a Doppler frequency of said target for correlated ranges and to produce a modulated signal centered at said Doppler frequency of said target for uncorrelated ranges;

a first accumulator coupled to said digital correlator, said first accumulator for accumulating said sinusoidal signal and said modulated signal for one PN sequence period and providing a first accumulator output; and a magnitude function coupled to said first accumulator, said magnitude function providing a magnitude of said first accumulator output.

8. In a PN receiver system, an apparatus for digital decimation as claimed in claim 7 wherein there is included at least one range gate, each said at least one range gate including said decimator, said digital correlator, said first accumulator and said magnitude function.

9. In a PN receiver system, an apparatus for digital decimation as claimed in claim 8 wherein each range gate further includes a second accumulator providing an output which includes range information of said target.

10. In a PN receiver system, an apparatus for digital decimation as claimed in claim 7 wherein there is further included:

a modulator for transmitting to said target a continuous wave signal modulated by a PN squence;

for a first set of PN sequences, said signal returned from said target being identical to said transmitted PN sequence; and for a second set of PN sequences, said signal returned from said target being predictably different from said transmitted PN sequence.

11. In a PN receiver system, a method for digital decimation of a returned signal returned from a target, said returned signal being down converted and being converted to digital form, said method for digital decimation comprising the steps of:

digitally decimating said returned signal in digital form to produce a decimated signal;

digitally correlating said decimated signal to produce an indication signal of a first kind, if a Doppler frequency of the target is correlated and to produce an indication signal of a second kind, if the Doppler frequency of the target is uncorrelated;

ditally attenuating said indication signal, except for said Doppler frequency of said target; and determining a range resolution $\Delta R$.

12. In a PN receiver system, a method for digital decimation of a signal as claimed in claim 11, wherein there is further included the steps of:

providing a first output by a processor for range information of said target; and providing a second output by a processor for velocity information of said target.

13. In a PN receiver system, a method for digital decimation of a signal as claimed in claim 11, wherein there is further included a step of repeating said steps of: digitally decimating, digitally correlating, digitally attenuating, providing a first output and providing a second output for a plurality of range gates.

14. In a PN receiver system, a method for digital decimation of a signal as claimed in claim 11, wherein there is further included a step of performing a fast Fourier transform on said indication signal to provide range of said target and velocity of said target.

15. In a PN receiver system, a method for digital decimation of a signal as claimed in claim 1, wherein there is further included a step of calculation a modulator PN sequence bandwidth, $T_b$, where $$T_b = 2\Delta R/c$$

where c is the speed of light.

16. In a PN receiver system, a method for digital decimation of a signal as claimed in claim 15, wherein there is further included a step of calculating an input bandwidth, B, for said range resolution where, $$B \geq c/2\Delta R = 1/T_b.$$

17. In a PN receiver system, a method for digital decimation of a signal as claimed in claim 16, wherein there is further included a step of choosing a PN sequence length, L.

18. In a PN receiver system, a method for digital decimation of a signal as claimed in claim 17, wherein there is further included a step of calculating a maximum unambiguous range $R_{max}$ where $$R_{max} = L[cT_b/2]$$

where L is the PN sequence length.

19. In a PN receiver system, a method for digital decimation of a signal as claimed in claim 18, wherein there is further included a step of calculating a maximum unambiguous Doppler frequency $f_{max}$ where $$f_{max} = \frac{1}{2\rho} \, 1/LT_b = \frac{1}{2\rho} \, WRF$$

where WRF is the word repetition frequency.

20. In a PN receiver system, a method for digital decimation of a signal as claimed in claim 11, wherein there is further included steps of transmitting a phase modulated signal; and said step of digitally correlating includes a step of digitally correlating a returned phase modulated signal.

21. In a PN receiver system, a method for digital decimation of a signal as claimed in claim 11, wherein there is further included steps of transmitting a amplitude modulated signal; and said step of digitally correlating includes a step of digitally correlating a returned amplitude modulated signal.

22. In a PN receiver system, a method for digital decimation of a signal as claimed in claim 11, wherein said step of digitally correlating includes a step of digitally correlating by performing cross-correlation on said returned signal.

* * * * *

UNITED STATES PATENT AND TRADEMARK OFFICE
CERTIFICATE OF CORRECTION

PATENT NO. : 5,757,848
DATED : May 26, 1998
INVENTOR(S) : Shawn Wesley Hogberg

It is certified that error appears in the above-identified patent and that said Letters Patent is hereby corrected as shown below:

Column 9, claim 5,
Line 51, delete "beig" and replace with -- being --.

Column 10, claim 15,
Line 65, delete "1" and replace with -- 11 --.

Signed and Sealed this

Twenty-eighth Day of August, 2001

*Attest:*

NICHOLAS P. GODICI
*Attesting Officer*    *Acting Director of the United States Patent and Trademark Office*